(12) United States Patent
Widener et al.

(10) Patent No.: US 10,262,376 B1
(45) Date of Patent: *Apr. 16, 2019

(54) SYSTEMS AND METHODS FOR AUTOMATICALLY UPDATING DATA REPRESENTATIVE OF INSURANCE RELATED INFORMATION

(71) Applicant: STATE FARM MUTUAL AUTOMOBILE INSURANCE COMPANY, Bloomington, IL (US)

(72) Inventors: Dean Justin Widener, Normal, IL (US); David Kuriyan Schuster, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,908

(22) Filed: Jun. 13, 2017

Related U.S. Application Data

(63) Continuation of application No. 14/152,016, filed on Jan. 10, 2014, now Pat. No. 9,760,951.

(51) Int. Cl.
*G06Q 40/00* (2012.01)
*G06Q 40/08* (2012.01)

(52) U.S. Cl.
CPC .................................. *G06Q 40/08* (2013.01)

(58) Field of Classification Search
CPC .............................. G06G 40/00; G06G 40/08
See application file for complete search history.

(56) References Cited

PUBLICATIONS

Harnessing health information in real time: back to the future for a more practical and effective infrastructure, Parente, Stephen T. AEI Paper & Studies Dec 1, 2010: 119 (21).*

* cited by examiner

*Primary Examiner* — Lalita M Hamilton
(74) *Attorney, Agent, or Firm* — Marshall, Gerstein & Borun LLP; Randall G. Rueth

(57) ABSTRACT

The present disclosure generally relates to systems and methods for automatically updating data representative of insurance related information. In particular, the present disclosure relates to systems and methods for automatically updating data representative of insurance related information based on data, representative of desired updates, entered by a customer and data representative of update rules. The data representative of desired updates may be compared to the data representative of the update rules to generate updates to data representative of insurance related information.

22 Claims, 6 Drawing Sheets

SYSTEMS AND METHODS FOR AUTOMATICALLY UPDATING DATA REPRESENTATIVE OF INSURANCE RELATED INFORMATION

CROSS-REFERENCE TO RELATED APPLICATION

The present application is a continuation of U.S. patent application Ser. No. 14/152,016, entitled SYSTEMS AND METHODS FOR AUTOMATICALLY UPDATING DATA REPRESENTATIVE OF INSURANCE RELATED INFORMATION, filed Jan. 10, 2014, the disclosure of which is incorporated herein in its entirety by reference.

TECHNICAL FIELD

The present disclosure generally relates to systems and methods for automatically updating data representative of insurance related information. In particular, the present disclosure relates to systems and methods for automatically updating data representative of insurance related information based on data representative of desired updates, that is entered by an insurance customer, and data representative of update rules.

BACKGROUND

Currently, data representative of insurance related information, such as insurance claim information, is manually updated. Typically, an insurance customer contacts an insurance agent via telephone and conveys update information. The insurance agent, in turn, manually updates data representative of the insurance related information based on her own knowledge and based on the information provided by the insurance customer.

For example, an insurance customer may experience a vehicle accident and be in need of a rental vehicle. The insurance customer may call an insurance agent to initiate the claim process and to request a rental vehicle. If the insurance customer's insurance policy provides for rental vehicle coverage, the insurance agent may update data representative of the insurance claim to include associated vehicle rental information. On the other hand, if the insurance customer's insurance policy does not provide for rental vehicle coverage, the insurance agent may inform the insurance customer of the fact and not update the data representative of the insurance claim.

Systems and methods are desired that enable an insurance customer to enter updates to data representative of insurance related information without the assistance of an insurance Agent. Moreover, systems and methods are desired that compare data representative of desired updates to data representative of insurance related information, entered by an insurance customer, to update rules and that update the data representative of insurance related information if the data representative of the desired updates satisfies the update rules.

SUMMARY

A computer-implemented method of automatically updating data representative of insurance related information may include receiving, at a processor of a computing device, current data, wherein the current data is representative of current insurance related information. The method may further include generating, using a processor of a computing device, a current display based on the current data, wherein the display presents current insurance related information to an insured individual. The method may also include receiving, at a processor of a computing device, change data from the insured individual, where the change data is representative of desired change information associated with the current insurance related information. The method may yet further include receiving, at a processor of a computing device, update rules data, wherein the update rules data is representative of rules related to updates to the current insurance related information that are permitted by an insured individual. The method may even yet further include determining, using a processor of a computing device, whether at least one change to the current insurance related information is acceptable based on the change data and the update rules data.

In another embodiment, a computer system for automatically updating data representative of insurance related information may include a current data receiving module stored on a memory that, when executed by a processor of a computing device, causes the processor to receive current data, wherein the current data is representative of current insurance related information. The computing system may also include a current display generating module stored on a memory that, when executed by a processor of a computing device, causes the processor to generate a current display based on the current data, wherein the display presents current insurance related information to an insured individual. The computer system may further include a change data receiving module stored on a memory that, when executed by a processor of a computing device, causes the processor to receive change data from the insured individual, where the change data is representative of desired change information associated with the current insurance related information. The computer system may yet further include an update rules data receiving module stored on a memory that, when executed by a processor of a computing device, causes the processor to receive update rules data, wherein the update rules data is representative of rules related to updates to the current insurance related information that are permitted by an insured individual. The computer system may even yet further include an acceptable change determining module stored on a memory that, when executed by a processor of a computing device, causes the processor to determine whether at least one change to the current insurance related information is acceptable based on the change data and the update rules data.

In yet a further embodiment, a tangible computer-readable memory storing instructions for automatically updating data representative of insurance related information may include a current data receiving module that, when executed by a processor of a client device, causes the processor of the client device to receive current data from a remote computing device, wherein the current data is representative of current insurance related information. The instructions may also include a current display generating module that, when executed by a processor of a client device, causes the processor of the client device to generate a current display based on the current data, wherein the display presents current insurance related information to an insured individual. The instructions may further include a change data receiving module that, when executed by a processor of a remote computing device, causes the processor of the remote computing device to receive change data from the insured individual via a client device, where the change data is representative of desired change information associated with the current insurance related information. The instructions may yet further include an update rules data receiving module that, when executed by a processor of a remote computing device, causes the processor of the remote computing device to receive update rules data, wherein the update rules data is representative of rules related to updates to the current insurance related information that are permitted by an insured individual. The instructions may even yet further include an acceptable change determining module that, when executed by a processor of a remote computing device, causes the processor of the remote computing device to determine whether at least one change to the current insurance related information is acceptable based on the change data and the update rules data.

BRIEF DESCRIPTION OF THE DRAWINGS

The figures described below depict various aspects of the systems and methods disclosed herein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

The systems and methods of the present disclosure provide the ability for an insurance customer to update their own information while protecting business information of an insurance provider. In particular, the systems and methods of the present disclosure may allow an insurance customer to update insurance claim information. The systems and methods may be applied to business processing data. Alternatively, the systems and methods may be applied to customer record management (CRM) data which may, otherwise, be updated in place.

Generally, the systems and methods of the present disclosure may present information to an insurance customer that is representative of current insurance related data, for example, data representative of a current insurance claim related to a vehicle accident. The systems and methods may receive desired changes to the current insurance related information from the customer, such as a request for a rental vehicle. The systems and methods may compare the desired changes, received from the insurance customer, to insurance provider rules, such as whether rental vehicle coverage is included in an associated insurance policy. The systems and methods may determine whether current insurance related information may be updated based on a comparison of the desired changes with the insurance provider rules. The systems and methods may automatically update the current insurance related information if a determination is made that the desire changes comply with the rules.

For example, if the insurance customer requests a rental vehicle and insurance provider rules (e.g., insurance policy coverage) provide for rental vehicle coverage, a current claim may be revised to include rental vehicle information. On the other hand, if the rules (e.g., insurance policy coverage) do not provide for rental vehicle coverage, the current insurance claim information may not be updated. In either event, the systems and methods of the present disclosure may generate a display that indicates the disposition to the insurance customer. Alternatively, if the systems and methods cannot make a final determination, the information may automatically be forwarded to an insurance agent to conduct a further review.

Figure 1:
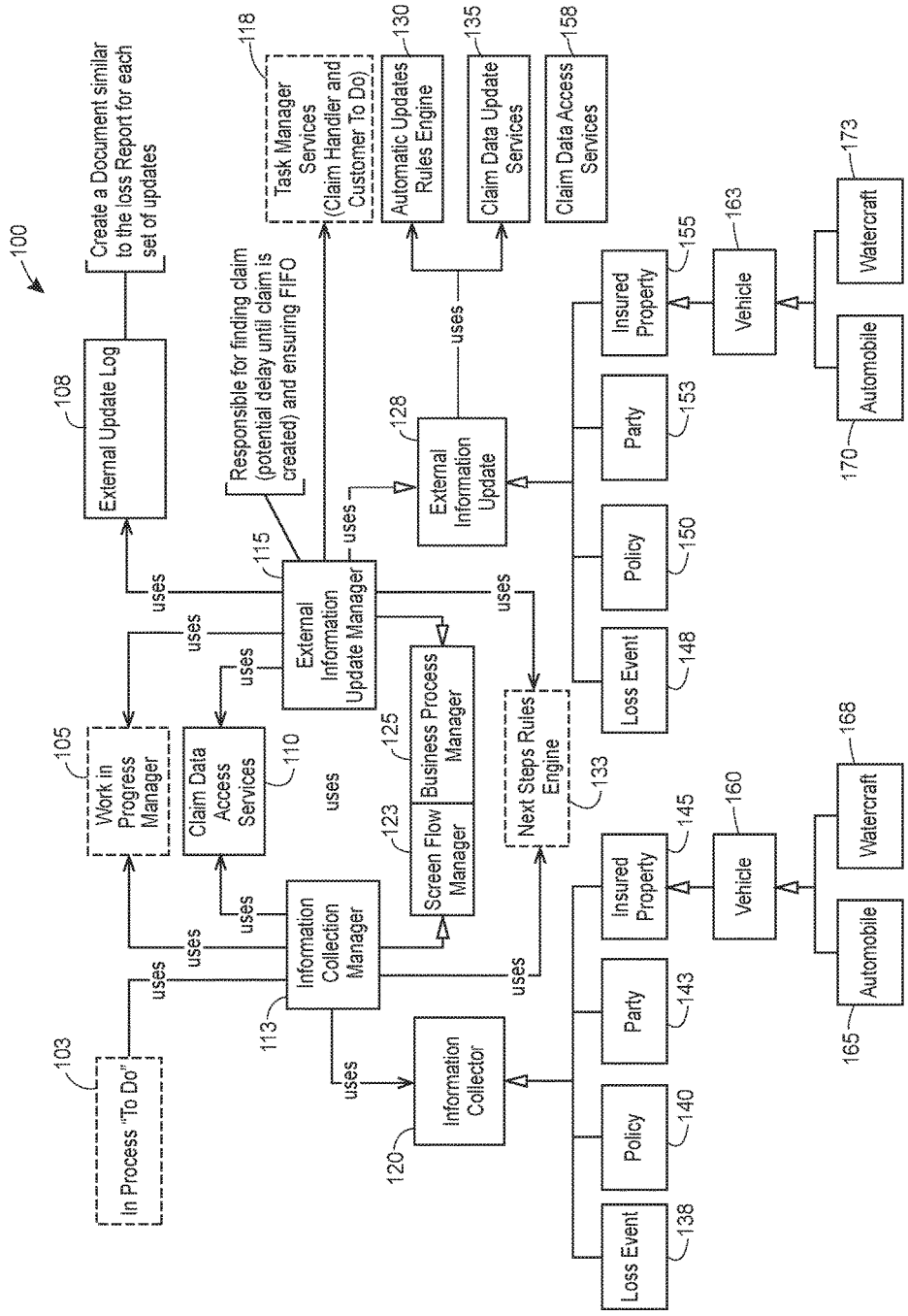
FIG. 1 depicts an example flow diagram for a method of automatically updating insurance related information.

Turning to FIG. 1, a flow diagram for an example method of automatically updating insurance related information 100 is illustrated. As described in detail herein, the method 100 may be implemented using the computer system 200 of FIG. 2. A line with a closed arrow (▷) in FIG. 1 generally represents an "is a" relationship. A line with an open arrow (>) in FIG. 1 generally represents a "uses" relationship. For example, loss event 138 "is a" information collector. As another example, loss event 148 "is a" external information update. A screen flow manager 123 and a business process manager 125 are abstract concepts. Accordingly, an information collection manager 113 "is a" screen flow manager 113 and an external information update manager 115 "is a" business process manager 125.

In any event, a processor (e.g., processor 250 of FIG. 2) may implement an information collector 120 to collect data representative of information related to insured property 145 that may, in turn, be representative of vehicle information 160 (e.g., automobile information 165 or watercraft information 168). The processor 250 may also implement the information collector 120 to collect data representative of information related to an insured party 143 (e.g., an insurance customer). The processor 250 may further implement the information collector 120 to collect data related to associated insurance policy information 140. The processor 250 may yet further implement the information collector 120 to collect data related to a loss event 138 (e.g., a claim related to damage due to a vehicle accident). The processor 250 may implement an information collection manager 113 to direct the information collector 120 to collect data related to the insured property 145, the party 143, the policy 140 and the loss event 138. The processor 250 may combine the data related to the insured property 145, the party 143, the policy 140 and the loss event 138 and generate current data that is representative of current insurance related information.

With further reference to FIG. 1, a processor (e.g., processor 225 of FIG. 2) may implement an external information update 128 to update data representative of information related to insured property 155 that may, in turn, be representative of vehicle information 155 (e.g., automobile information 170 or watercraft information 173). The processor 225, further implementing the external information update 128, may update data representative of information related to an insured party 153 (e.g., an insurance customer). The processor 225, yet further implementing the external information update 128, may update data related to associated insurance policy information 150. The processor 225, also implementing the external information update 128, may update data related to a loss event 148 (e.g., a claim related to damage due to a vehicle accident). The processor 225 may implement an external information update manager 115 to direct the external information update 128 to collect data related to the insured property 155, the party 153, the policy 150 and the loss event 148. The external information update manager 115 is, for example, responsible for finding an existing insurance claim, or delay any update until a claim is created. Furthermore, the external information update manager 115 may ensure first-in-first-out (FIFO) manipulation of data. The external information update manager 115 may initiate a task manager services (Claim handler and customer to do) 118 to perform various tasks. The processor 225 may combine the data related to the insured property 155, the party 153, the policy 150 and the loss event 148 and generate change data that is representative of desired changes desired by an insurance customer to the current insurance related information.

With yet further reference to FIG. 1, the processor 250 may implement a claim data access services 110, a screen flow manager 123 and a business process manager 125 to coordinate implementation of the information collection manager 113 and the external information update manager 115. For example, the processor 250 may implement the claim data access services 110, the screen flow manager 123 and the business process manager 125, along with implementation of the next steps rules engine 133 to determine whether desired insurance related information changes, received from an insurance customer, comply with insurance provider rules (e.g., rules with an insurance policy 140). The processor 250 may further implement a work in progress manager 105 to generate an external update log 108. The external update log 108 may be representative of a record disposition of a customer update.

As illustrated by dashed-line boxes in FIG. 1, the in process "to do" list 103, the task manager services (Claim handler and customer to do) 118 and the next step rules engine 133 may be implemented separate from the method 100. For example, the in process "to do" list 103, the task manager services (Claim handler and customer to do) 118 and the next step rules engine 133 may be implemented as a "customer to do" process. These are items that a customer needs to complete to assist the processing of an insurance claim. Some of the items may be identified during a screen flow, such as when another vehicle is involved in an insurance claim and to provide the other vehicle driver information. Identifying next steps and having an in process customer to do may facilitate incorporation of related information into a corresponding screen flow process. If a client does not have the information, the information may be input via a regular customer to do process. The same rules may be applied to "to do" items in a screen flow process as applied to separate work items to be done later. As further illustrated in FIG. 1 using a dashed-line box, the work in progress manager 105 may be implemented separate from the method 100 to manage items collected but not yet processed. The progress manager 105 may form a connection between the information collection manager 113 and external information update manager 115. The external information update manager 115 may also use the work in progress manager 105 to see other work waiting and to ensure first-in-first-out (FIFO).

With even further reference to FIG. 1, the processor 250 may further implement the external information update 128 to access an automatic update engine 130 and a claim data update service 135 to generate data representative of whether change data, representative of desired changes to current insurance information, comply with rule data that is representative of insurance provider rules (e.g., rules within an insurance policy).

As a specific example, the processors 225, 250 may implement, at least portions of, the method 100 to allow an insurance customer to create or modify a vehicle rental reservation. Generally, a vehicle rental may be requested once an associated loss has been submitted. However a vehicle rental cannot be sent to a vendor until a claim has been created and a cause of loss (COL) has been created and a rental performer assigned. Creation of a COL may indicate that insurance coverage exists and may also set reserves. The processor 250 may determine that a vehicle rental is not valid on a duplicate claim. Furthermore, the associated claim must be in an open status. The processor 225 may allow an insurance customer to select a vehicle rental branch and date of pick up from a corresponding display and submit the request. The processor 250 may log the request in the work in progress and start the handle rental request process. Generally, a rental branch and vehicle type cannot be automatically changed by a client once the rental vehicle has been picked up. However, in accordance with blocks 635, 640 of FIG. 6, an agent may be able to modify a rental branch and a vehicle type subsequent to the rental vehicle being picked up. The processor 250 may implement the rental request process to ensure that the claim has been created. The processor 250 may escalate the request to an insurance agent if the request does not comply with associated rules. The processor 250 may also implement the rental request process to ensure the current request is the next transaction to be applied to the claim (e.g., the processor 250 may wait for a prior transaction and escalate the current request if the current request does not meet an associated service level agreement (SLA)). The processor 250 may implement a rental request process to ensure the claim is in a valid state for rental reservation and escalate the request to an insurance agent if the request does not comply with associated rules. The processor 250 may implement a rental request process to ensure the cause of loss (COL) has been created (e.g., the processor 250 may try to create the rental automatically or escalate the request to an insurance agent to create the rental). The processor 250 may further implement the rental request process to ensure that a rental performer is assigned to the claim (e.g., the processor 250 may try to automatically assign or escalate the request to an insurance agent to assign the request). If a new request, the processor 250 may implement a rental request process to ensure a duplicate rental request does not exist (e.g., the processor 250 may automatically reconcile differences or escalate the request to an insurance agent to resolve). If the request is an updated request, the processor 250 may implement the rental request process to ensure that the prior reservation exists and that the prior reservation is in a state to accept updates. If the processor 250 cannot determine whether a prior reservation exists, the processor 250 may escalate the request to an insurance agent. The processor 250 may implement a rental request process to determine if a rental reservation or update is valid for this claim. The processor 250 may escalate the request to an insurance agent to resolve (e.g., if a claim was marked as duplicate, then the rental is not valid). The processor 250 may implement a rental request process to create/update rental reservation. The processor 250 may implement a rental request process to record the resolution of the customer's rental request. The processor 250 may monitor the entire rental request process to determine how many times the rental request process must be assisted by a claim handler. The processor 250 may analyze trends for opportunities to make improvements to the process. The processor 250 may monitor the entire process to determine a status of any given request.

Figure 2:
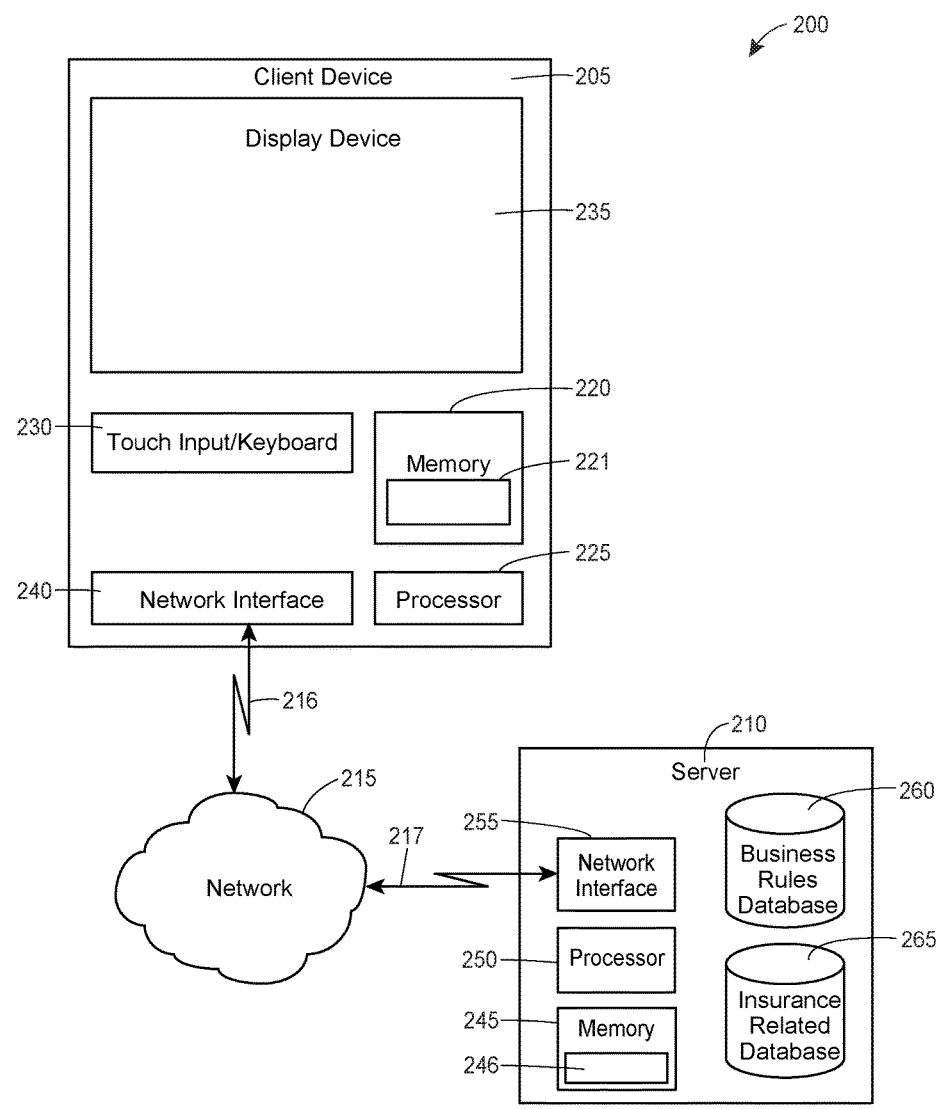
FIG. 2 depicts a high-level block of an example system for automatically updating insurance related information.

The details associated with a computer system 200 for automatically updating insurance related information are now described beginning with reference to FIG. 2. FIG. 2 depicts a high-level block diagram of a computer system 200 that implements communications between a client device 205 (e.g., a personal computer or a mobile telephone) and a remote computing device (e.g., server 210) to automatically provide updated data to an insurance related database 265. The client device 205 may be communicatively coupled to the remote computing device 210 via a network 215.

For clarity, only one client device 205 is depicted in FIG. 2. While FIG. 2 depicts only one client device 205, it should be understood that any number of client devices 205 may be supported and that each client device 205 may be any appropriate computing device, such as a mobile telephone, a personal data assistant, a tablet, a desk-top computer or a lap-top computer. The client device 205 may include a memory 220 and a processor 225 for storing and executing, respectively, a module 221. The module 221, stored in the memory 220 as a set of computer-readable instructions, may be related to an insurance application that, when executed on a processor 225, causes the processor 225 to receive change data (e.g., data representative of a desired vehicle rental) from an insurance customer via the touch input/keyboard 230 and/or the display 235. As described in detail herein, the module 221 may facilitate interaction between the client device 205 and the remote computing device 210.

The processor 225, further executing the module 221, may facilitate communications between the computing device 210 and the client device 205 via a network interface 240, a client device network connection 216 and the network 215. The display device 235 which may be any type of electronic display device such as a liquid crystal display (LCD), a light emitting diode (LED) display, a plasma display, a cathode ray tube (CRT) display, or any other type of known or suitable electronic display. The touch input/keyboard/pointing device 230 (e.g., user input device such as a mouse) may provide a mechanism for a user of the client device 205 to launch a data entry application and to enter related change information. The user input device 230 may be configured as an integral part of a display device 235, such as a touch screen display device. The network interface 240 may be configured to facilitate communications between the client device 205 and the remote computing device 210 via any hardwired or wireless communication network 215, including, for example, a hardwired Ethernet connection or a wireless LAN, MAN or WAN, WiFi, the Internet, or any combination thereof. Moreover, the client device 205 may be communicatively connected to the remote computing device 210 via any suitable communication system, such as via any publicly available or privately owned communication network, including those that use wireless communication structures, such as wireless communication networks, including for example, wireless LANs and WANs, satellite and cellular telephone communication systems, etc.

The computing device 210 may include a memory 245 and a processor 250 for storing and executing, respectively, a module 246. The module 246, stored in the memory 245 as a set of computer-readable instructions, facilitates applications related to automatically updating insurance related data. The module 245 may also facilitate communications between the computing device 210 and the client device 205 via a network interface 255, a remote computing device network connection 217 and the network 215 and other functions and instructions.

Figure 3:
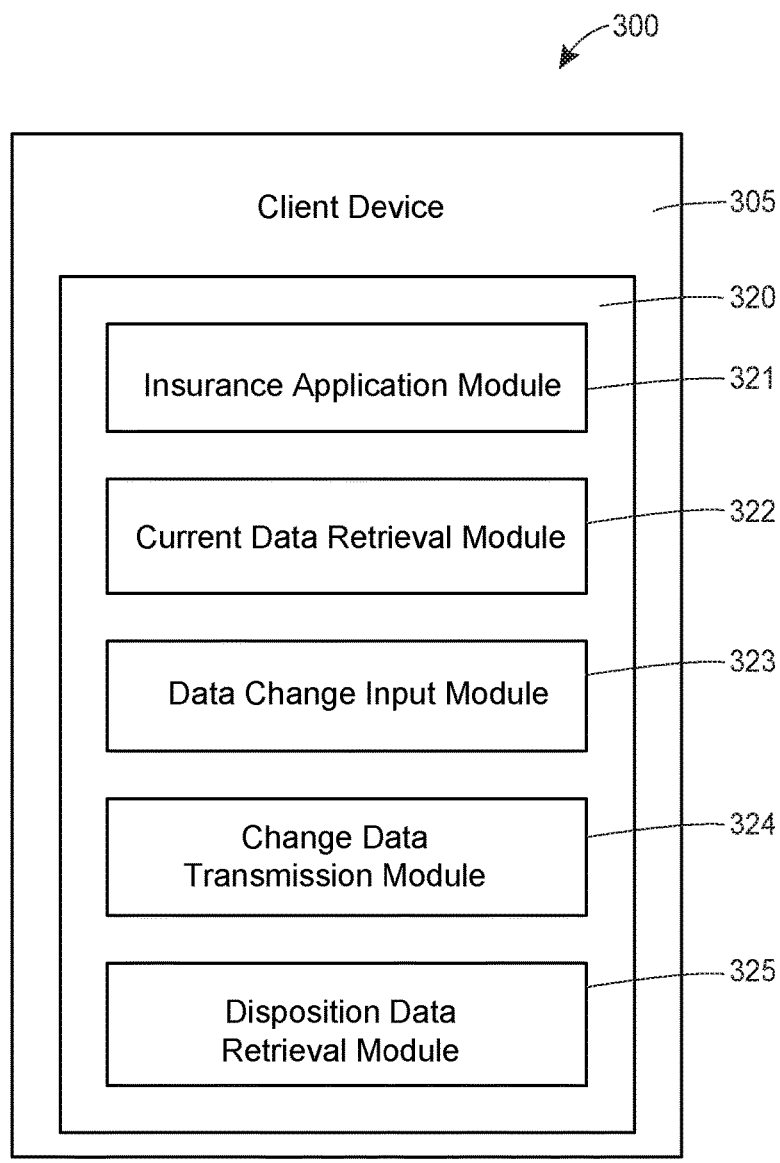
FIG. 3 depicts a block diagram of an example client device for automatically updating insurance related information.

The computing device 210 may be communicatively coupled to an insurance related database 265 and/or a business rules database 260. While the insurance related database 265 and the business rules database are shown in FIG. 3 as being communicatively coupled to the remote computing device 210, it should be understood that the insurance related database 265 and/or the business rules database 260 may be located within separate remote servers (or any other suitable computing devices) communicatively coupled to the remote computing device 210. Optionally, portions of insurance related database 265 and/or the business rules database 260 may be associated with memory modules that are separate from one another, such as a memory 220 of the client device 205. The computer system 200 may accommodate multiple channels (e.g., mobile, web or IVR). The computer system 200 may also generate versioning of data to be updated and business rules. Furthermore, the computer system 200 may track which rules cause manual review to allow business process improvements.

Turning to FIG. 3, a block diagram 300 of a client device 305 is depicted. The client device 305 may be similar to the client device 205 of FIG. 2. The client device 305 may include an insurance application module 321, a current insurance information related data retrieval module 322, a data change input module 323, a change data transmission module 324 and a disposition data retrieval module 325 stored on a memory 320. Implementation of the modules 321-325 may allow, for example, an insurance customer to enter desired change data (e.g., data representative of a vehicle rental request) via the client device 305.

Figure 4:
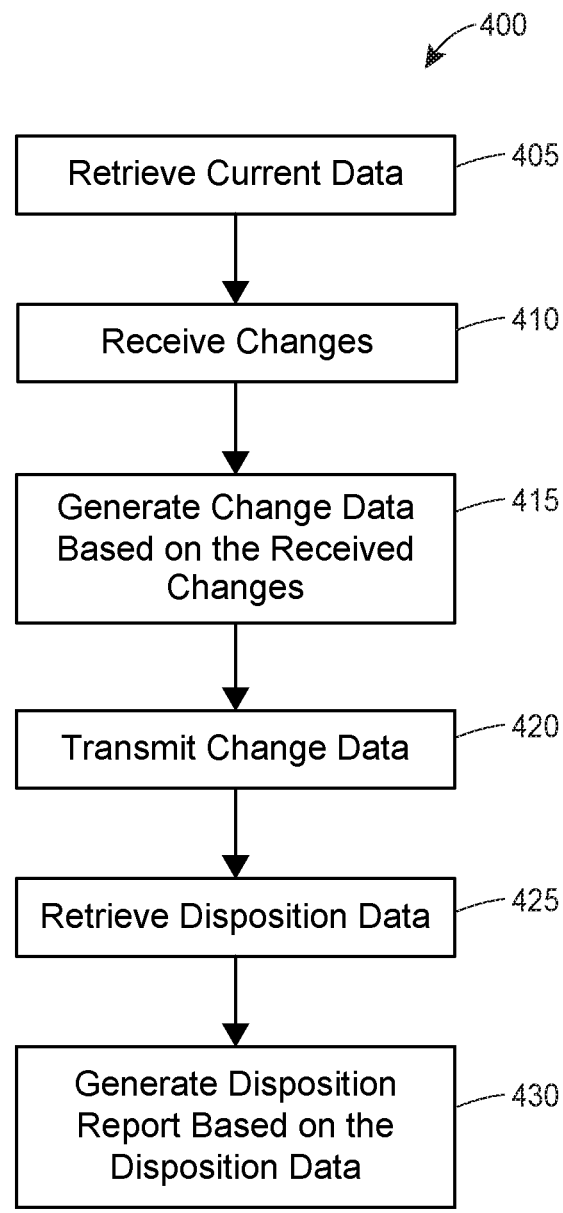
FIG. 4 depicts a flow diagram of an example method of entering desired updates to insurance related data representative of insurance related information.

With reference to FIG. 4, a flow diagram for a method of entering desired change data 400 is depicted. The method 400 may, for example, be implemented by a processor (e.g., processor 225 of FIG. 2) executing the modules 321-325. In particular, the processor 225 may execute the current insurance information related data retrieval module 322 to retrieve current data that is representative of current insurance related information (block 405). The processor 225 may execute the data change input module 323 to receive change data that is representative of change(s) that an insurance customer wishes to make to the current insurance related information (block 410). The processor 225 may execute the change data transmission module 324 to transmit change data from the client device 205 to, for example, a remote computing device (e.g., server 210 of FIG. 2) (block 420). As described in detail below, a processor (e.g., processor 250) of the remote computing device 210 may generate disposition data representative of determinations related to whether the desired changes are determined to comply with corresponding change rule data. In any event, the processor 225 may execute the disposition data retrieval module 325 to retrieve disposition data (block 425). The processor 225 may further execute the disposition data retrieval module 325 to generate a disposition report (e.g., a display) based on the disposition data (block 430).

Figure 5:
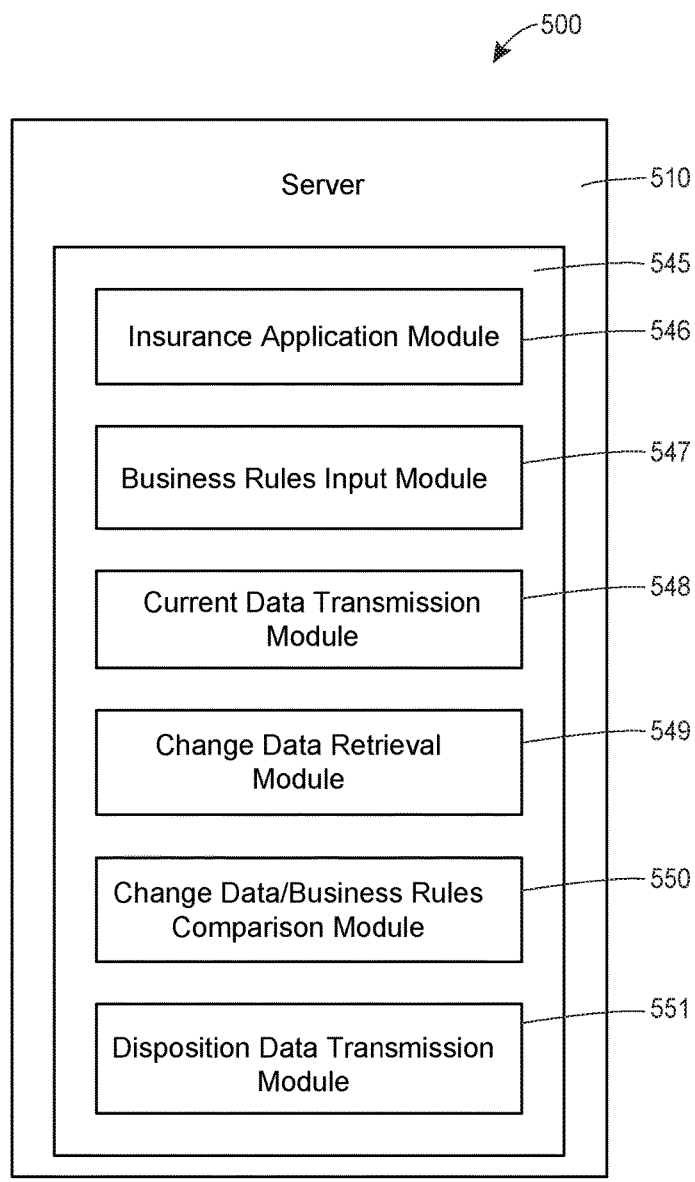
FIG. 5 depicts a block diagram of an example computing device for automatically updating insurance related information.

With reference to FIG. 5, a block diagram of an example remote computing device (e.g., server) 510 is depicted. The remote computing device 510 may be similar to the remote computing device 210 of FIG. 2. The remote computing device 510 may include an insurance application module 546, a business rules input module 547, a current data transmission module 548, a change data retrieval module 549, a change data/business rules comparison module 550 and a disposition data transmission module 551 stored on a memory 545. A processor (e.g., processor 250 of FIG. 2) may execute the modules 546-551 to determine disposition data based on a determination whether at least one desire change to the current insurance related data complies with corresponding business rules.

Figure 6:
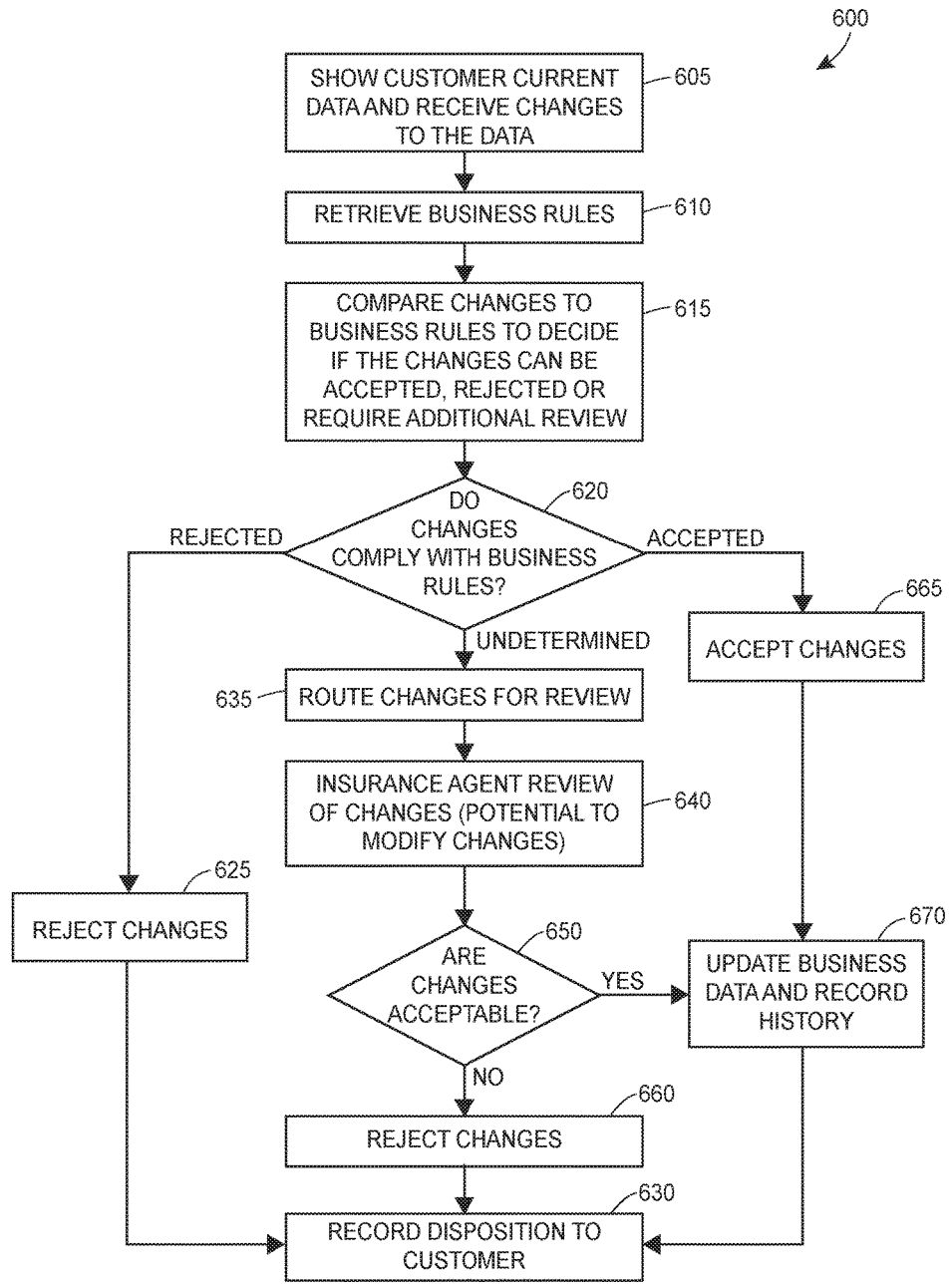
FIG. 6 depicts a flow diagram of an example method of generating updates to insurance related data representative of insurance related information.

With reference to FIG. 6, a flow diagram is depicted for a method of determining disposition data 600. The disposition data 600 may, for example, be indicative of whether a desired change to the current insurance related information complies with corresponding business rules (e.g., is a vehicle rental request valid). The processor 250 may execute the current data transmission module 548 and the processor 225 may execute the insurance application module 321 to present a display to an insurance customer representative of current data (block 605). The processor 250 may execute the change data retrieval module 549 to retrieve desired changes to the current insurance related information (block 605). The processor 250 may execute the business rules input module 547 to retrieve business rules (e.g., rules related to vehicle rental within an insurance policy) (block 610). The processor 250 may execute the insurance application module 546 and the change data/business rules comparison module 550 to automatically compare the desired changes to the business rules to automatically decide if the changes can be accepted, rejected or require additional review by an insurance agent (block 615). If the processor 250 determines that the changes do not comply with the rules (block 620), the processor 250 may automatically reject the changes (block 625) and generates a corresponding record of the disposition (block 630). The processor 250 may further execute the disposition data transmission module 551 to automatically transmit the disposition data to a client device 205, 305 (block 630). If the processor 250 cannot determine whether the desire changes comply with the business rules (block 620), the processor 250 may automatically route the changes to an insurance agent for review (block 635). The insurance agent may review the desired changes and may modify the desire changes (block 640). The insurance agent may then determine whether any desired changes, or modified changes, comply with the business rules (block 650). If the insurance agent determines that the desire changes, or the modified changes, comply with the business rules (block 650), the insurance agent may update the current insurance related information (block 670). If the insurance agent determines that the desired changes, or the modified changes, do not comply with the business rules (block 650), the insurance agent may reject the changes (block 660). The insurance agent may send a disposition report to the insurance customer that reflects the disposition (block 630). If the processor 250 determines that the desired changes comply with the business rules (block 620), the processor 250 may automatically reject the desired changes (block 665) and the processor 250 may automatically update the current insurance related information (block 670). The processor 250 may automatically generate a record of the disposition and send the record to the insurance customer (block 630).

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed is:

1. A computer-implemented method for an insured individual to automatically determine whether a change to an insurance claim is available via an insurance policy of the insured individual, the method comprising:
    automatically receiving, by a processor of a computing device, current valid insurance claim data in response to an action by the insured individual, via a user input device, wherein the current valid insurance claim data is representative of information related to an existing valid insurance claim;
    automatically generating, by a processor of a computing device, a current display, on a display device connected to the computing device, based on the current valid insurance claim data, wherein the display presents current valid insurance claim related information to the insured individual including a cause of loss and an assigned vendor for correction of the loss;
    automatically receiving, by a processor of a computing device, current valid insurance claim change data from the insured individual via a user input device, where the current valid insurance claim change data is representative of desired insurance claim change information associated with the current valid insurance claim data, and wherein the desired insurance claim change information pertains to the assigned vendor;
    automatically receiving, by a processor of a computing device, update rules data from an update rules data database stored on a memory of the computing device, wherein the update rules data is representative of rules related to updates to the current valid insurance claim data that are permitted by the insured individual in accordance with the insurance policy of the insured individual;
    automatically determining, by a processor of a computing device, whether at least one change to the current valid insurance claim data is acceptable based on the current valid insurance claim change data and the update rules data;
    if the at least one change to the current valid insurance claim data is determined, by the processor of the computing device, to be acceptable, the current valid insurance claim data is automatically changed, by the processor of the computing device, based on the current valid insurance claim change data and the processor automatically provides an indication to the insured individual that the at least one change is acceptable; and
    if the at least one change to the current valid insurance claim data is determined, by the processor of the computing device, to not be acceptable, the current valid insurance claim data remains unchanged and the processor automatically provides an indication to the insured individual that the at least one change is not acceptable.

2. The method of claim 1, wherein the current insurance related information is representative of an insurance claim.

3. The method of claim 1, further comprising:
    generating, using a processor of a computing device, updated insurance related data, based on the change data, when the processor determines that at least one change to the current insurance related information is acceptable, wherein the updated insurance related data is representative of updated insurance related information.

4. The method of claim 3, further comprising:
    generating, using a processor of a computing device, an updated display based on the updated insurance related data, wherein the updated display indicates changes to the current insurance related information that have been accepted.

5. The method of claim 1, further comprising:
generating, using a processor of a computing device, rejection data, based on the change data, when the processor determines that at least one change to the current insurance related information is not acceptable, wherein the rejection data is representative of reasons for rejection information.

6. The method of claim 5, further comprising:
generating, using a processor of a computing device, a rejection display based on the rejection data, wherein the rejection display indicates at least one reason why at least one change has been rejected.

7. The method of claim 1, further comprising:
generating, using a processor of a computing device, insurance agent data based on the change data when the processor is unable to determine whether, or not at least one change to the current insurance related information is acceptable.

8. The method of claim 7, further comprising:
generating, using a processor of a computing device, an insurance agent display based on the insurance agent data, wherein the insurance agent display indicates that the processor was unable to determine whether, or not at least one change is acceptable.

9. A computer system for an insured individual to automatically determine whether a change to an insurance claim is available via an insurance policy of the insured individual, the computer system comprising:
a current data receiving module stored on a memory that, when executed by a processor of a computing device, causes the processor to automatically receive current valid insurance claim data in response to an action by the insured individual, via a user input device, wherein the current valid insurance claim data is representative of information related to an existing valid insurance claim;
a current display generating module stored on a memory that, when executed by a processor of a computing device, causes the processor to automatically generate a current display based on the current valid insurance claim data, wherein the display presents current valid insurance claim related information to an insured individual;
a change data receiving module stored on a memory that, when executed by a processor of a computing device, causes the processor to automatically receive current valid insurance claim change data from the insured individual, where the current valid insurance claim change data is representative of desired insurance claim change information associated with the current valid insurance claim data;
an update rules data receiving module stored on a memory that, when executed by a processor of a computing device, causes the processor to automatically receive update rules data, wherein the update rules data is representative of rules related to updates to the current valid insurance claim related data that are permitted by the insured individual in accordance with the insurance policy of the insured individual;
an acceptable change determining module stored on a memory that, when executed by a processor of a computing device, causes the processor to automatically determine whether at least one change to the current valid insurance claim data is acceptable based on the current valid insurance claim change data and the update rules data;
if the at least one change to the current valid insurance claim data is determined, by the processor of the computing device, to be acceptable, the current valid insurance claim data is automatically changed, by the processor of the computing device, based on the current valid insurance claim change data and the processor automatically provides an indication to the insured individual that the at least one change is acceptable; and
if the at least one change to the current valid insurance claim data is determined, by the processor of the computing device, to not be acceptable, the current valid insurance claim data remains unchanged and the processor automatically provides an indication to the insured individual that the at least one change is not acceptable.

10. The computer system of claim 9, further comprising:
an updated insurance related data generating module stored on a memory that, when executed by a processor of a computing device, causes the processor to generate updated insurance related data, based on the change data, when the processor determines that at least one change to the current insurance related information is acceptable, wherein the updated insurance related data is representative of updated insurance related information.

11. The computer system of claim 10, further comprising:
an updated display generating module stored on a memory that, when executed by a processor of a computing device, causes the processor to generate an updated display based on the updated insurance related data, wherein the updated display indicates changes to the current insurance related information that have been accepted.

12. The computer system of claim 9, further comprising:
a rejection data generating module stored on a memory that, when executed by a processor of a computing device, causes the processor to generate rejection data, based on the change data, when the processor determines that at least one change to the current insurance related information is not acceptable, wherein the rejection data is representative of reasons for rejection information.

13. The computer system of claim 12, further comprising:
a rejection display generating module stored on a memory that, when executed by a processor of a computing device, causes the processor to generate a rejection display based on the rejection data, wherein the rejection display indicates at least one reason why at least one change has been rejected.

14. The computer system of claim 9, further comprising:
an insurance agent data generating module stored on a memory that, when executed by a processor of a computing device, causes the processor to generate insurance agent data based on the change data when the processor is unable to determine whether, or not at least one change to the current insurance related information is acceptable.

15. The computer system of claim 14, further comprising:
an insurance agent display generating module stored on a memory that, when executed by a processor of a computing device, causes the processor to generate an insurance agent display based on the insurance agent data, wherein the insurance agent display indicates that the processor was unable to determine whether, or not at least one change is acceptable.

16. A tangible computer-readable memory storing instructions for an insured individual to automatically determine whether a change to an insurance claim is available via an insurance policy of the insured individual, the tangible computer-readable memory comprising:

a current data receiving module that, when executed by a processor of a computing device, causes the processor to automatically receive current valid insurance claim data in response to an action by the insured individual, via a user input device, wherein the current valid insurance claim data is representative of information related to an existing valid insurance claim;

a current display generating module that, when executed by a processor of a computing device, causes the processor to automatically generate a current display based on the current valid insurance claim data, wherein the display presents current valid insurance claim related information to an insured individual;

a change data receiving module that, when executed by a processor of a computing device, causes the processor to automatically receive current valid insurance claim change data from the insured individual, where the current valid insurance claim change data is representative of desired insurance claim change information associated with the current valid insurance claim data;

an update rules data receiving module that, when executed by a processor of a computing device, causes the processor to automatically receive update rules data, wherein the update rules data is representative of rules related to updates to the current valid insurance claim related data that are permitted by the insured individual in accordance with the insurance policy of the insured individual;

an acceptable change determining module that, when executed by a processor of a computing device, causes the processor to automatically determine whether at least one change to the current valid insurance claim data is acceptable based on the current valid insurance claim change data and the update rules data;

if the at least one change to the current valid insurance claim data is determined, by the processor of the computing device, to be acceptable, the current valid insurance claim data is automatically changed, by the processor of the computing device, based on the current valid insurance claim change data and the processor automatically provides an indication to the insured individual that the at least one change is acceptable; and if the at least one change to the current valid insurance claim data is determined, by the processor of the computing device, to not be acceptable, the current valid insurance claim data remains unchanged and the processor automatically provides an indication to the insured individual that the at least one change is not acceptable.

17. The computer system of claim 16, further comprising:
an updated insurance related data generating module that, when executed by a processor of a computing device, causes the processor to generate updated insurance related data, based on the change data, when the processor determines that at least one change to the current insurance related information is acceptable, wherein the updated insurance related data is representative of updated insurance related information.

18. The computer system of claim 17, further comprising:
an updated display generating module that, when executed by a processor of a computing device, causes the processor to generate an updated display based on the updated insurance related data, wherein the updated display indicates changes to the current insurance related information that have been accepted.

19. The computer system of claim 16, further comprising:
a rejection data generating module that, when executed by a processor of a computing device, causes the processor to generate rejection data, based on the change data, when the processor determines that at least one change to the current insurance related information is not acceptable, wherein the rejection data is representative of reasons for rejection information.

20. The computer system of claim 19, further comprising:
a rejection display generating module that, when executed by a processor of a computing device, causes the processor to generate a rejection display based on the rejection data, wherein the rejection display indicates at least one reason why at least one change has been rejected.

21. The computer system of claim 16, further comprising:
an insurance agent data generating module that, when executed by a processor of a computing device, causes the processor to generate insurance agent data based on the change data when the processor is unable to determine whether, or not at least one change to the current insurance related information is acceptable.

22. The computer system of claim 21, further comprising:
an insurance agent display generating module that, when executed by a processor of a computing device, causes the processor to generate an insurance agent display based on the insurance agent data, wherein the insurance agent display indicates that the processor was unable to determine whether, or not at least one change is acceptable.

* * * * *